United States Patent [19]

Tousch

[11] Patent Number: 4,725,777
[45] Date of Patent: Feb. 16, 1988

[54] MOTION MEASURING DEVICE USING SPECIALIZED CODING

[75] Inventor: Roland Tousch, Bievres, France

[73] Assignee: Matra Transport, France

[21] Appl. No.: 831,307

[22] Filed: Feb. 20, 1986

[30] Foreign Application Priority Data

Feb. 20, 1985 [FR] France .................. 85 02451

[51] Int. Cl.[4] ............................ G01B 7/30; G01P 3/48
[52] U.S. Cl. .................................. 324/208; 324/166; 324/173
[58] Field of Search ............... 324/173, 174, 207, 208, 324/262, 260, 236, 233, 239, 240, 226, 229, 230, 231, 391, 392, 178, 179, 166, 168, 169; 123/414; 340/870.31, 870.32, 870.34

[56] References Cited

U.S. PATENT DOCUMENTS

| 2,325,927 | 8/1943 | Wilbur | 324/173 |
|---|---|---|---|
| 2,630,529 | 3/1953 | Mann et al. | 324/173 |
| 3,156,115 | 11/1964 | Adelmann | 324/173 X |
| 3,456,499 | 7/1969 | South | 324/173 X |
| 3,651,500 | 3/1972 | Weir | 324/173 X |
| 3,786,354 | 1/1974 | Lasky | |
| 3,863,235 | 1/1975 | McKee et al. | 324/207 X |
| 4,156,192 | 5/1979 | Schedrovitsky et al. | 324/208 |
| 4,401,986 | 8/1983 | Treukler et al. | 324/208 X |
| 4,580,047 | 4/1986 | Sasaki et al. | 324/173 X |
| 4,600,884 | 7/1986 | Hara | 324/236 |

Primary Examiner—Reinhard J. Eisenzopf
Assistant Examiner—Warren S. Edmonds
Attorney, Agent, or Firm—Larson and Taylor

[57] ABSTRACT

A motion measurement device, more particularly designed for measurement of a rotation of a body around an axis. This device comprises a coded wheel drivably connected to said body for rotation and comprising a plurality of holes regularly distributed around said axis. Said holes are binary digits and for one digit is constituted by a simple hole passing through the wheel and, for the other, an open hole connected to the nearest edge of said wheel by a narrow slit. A sensor placed on the path of the holes and comprising two coils facing one another allows determination of the distance travelled by the moving body connected to said coded wheel. The speed and acceleration of the moving body can also be determined.

9 Claims, 3 Drawing Figures

MOTION MEASURING DEVICE USING SPECIALIZED CODING

BACKGROUND OF THE INVENTION

The invention relates to a motion measuring device, particularly for measuring rotation of a body around an axis, said device comprising means such as a coded wheel drivably connected to said body for rotation and having a plurality of holes spaced regularly around said axis and comprising at least one sensor placed on the path of said holes. With such a device, and said coded wheel being mechanically connected to a wheel of a moving object, the distance travelled by said moving object may be determined, as well as the speed and acceleration of said object by measurement of time of displacement.

Known devices of this type typically include a wheel formed by a disk or a cylinder made from a high magnetic permeability material, said measuring wheel having teeth passing in front of the sensor. This solution has the disadvantage of generating a binary electrical signal whose levels are often insufficiently dissociated for allowing measurement under good conditions.

SUMMARY OF THE INVENTION

It is a main object of the invention to provide an improved motion measuring device of the above-defined type, said device particularly providing a high detection signal level.

To this end, the invention provides a device comprising:

(a) coded means made from an electrically conducting material, drivably connected to said body for motion therewith about an axis, comprising at least one edge formed with a plurality of holes in close proximity to said edge and regularly distributed angularly about said axis, said holes including first holes separated from said edge and second holes connected to said edge by a slit narrow in comparison with the size of said holes, said first and second holes representing different binary digits;

(b) sensor means placed at a predetermined location on the path of said holes and comprising two coils straddling said coded means;

(c) and means associated with said sensor means for detecting the mutual inductance of said coils.

Two mutually aligned air coils will be preferably used one of which is associated with a high frequency energizing circuit and the second with a circuit for comparing the amplitude of the output signal of said second coil with the energizing signal.

For measuring the amplitude of the movement or speed, the holes of the coded means will typically constitute a regular succession of 0s and 1s. When, on the contrary, the identification of the position of the coded means is researched, the holes must form a non-cyclic binary code, stored in a processing circuit associated with the sensor, a sequence of 8 bits being sufficient for locating 256 positions, which is often largely sufficient.

A hole between the two coils of a sensor has the same effect than a short circuit turn added to the secondary of the transformer formed by the two coils. The energy radiated by the emission coil, which receives the energizing signal, is therefore entirely absorbed by the turn so that the voltage and current in the reception coil are near zero. A hole open to the edge of the wheel by a narrow slit has the same effect than a capacitor connecting the two hot spots of the coils. This hole is therefore substantially increasing the level of the reception signal, which becomes much greater than the coupling of the two air coils in the absence of the coded means.

Since the system uses no resonant or tuned circuit, it may operate over a very wide temperature range, and the control electronics may be readily located away from the sensor. This allows the device to be used when the coded means are is in a difficult environment.

It is also an object of the invention to provide a device for measurement of a motion which is more particularly a rotation.

To this end, the invention discloses a device comprising:

(a) a coded wheel of electrically conducting material, drivably connected to said body for rotation therewith about an axis, comprising at least one circular edge and a plurality of holes formed in said wheel in close proximity to said edge and regularly distributed angularly about said axis, said holes including first holes separated from said edge and second holes connected to said edge by a slit narrow in comparison with the size of said hole;

(b) sensor means placed at a predetermined location close to the path of said holes, and comprising two coils straddling said coded wheel, and (c) means associated with said sensor means for detecting the mutual inductance of said coils.

It is another object of the invention to provide a device ensuring safety of the measurement, by providing a simple check of the validity thereof.

For this purpose, the invention provides a device comprising two independent systems of different kinds, supplying indications whose coherence between each other may be checked at each measurement. The ambient conditions (temperature for instance) are often making impossible optical measurement. The invention overcomes this difficulty by providing a non-cyclic binary code with N holes, a clock wheel with N teeth associated with at least one detector generating a pulse at passage of one of said teeth, and comprising a processing circuit comprising a memory in which the sequence forming the non-cyclic code is stored, said circuit being arranged for verifying, upon occurence of each pulse generated by the detector of said clock wheel, that the sequence of the coded wheel is identical to the stored sequence.

The clock wheel may be more particularly of a material having high magnetic permeability at high frequences, and comprising a set of teeth; said teeth will typically be distributed with the same angular spacing as said holes, and said detector means comprise two detection units, each of said units including a magnetic core having at least one pole close to the path of said teeth, whereby rotation of said clock wheel causes changes in the reluctance of a magnetic circuit including said core and a coil operatively associated with said core, the poles of said two circuits being separated by an odd number of half said angular spacing, whereby the reluctance of the magnetic circuit of the first of said coils increases when the reluctance of the magnetic circuit of the second of said coils decreases.

Although this clock wheel construction is preferred (and may moreover be used independently of the above-mentioned coded wheel), it may be replaced by other types for guaranteeing reliability of the measurement.

The invention will be better understood from the following description of a particular embodiment, given by way of example.

DETAILED DESCRIPTION OF INVENTION

Figure 1:
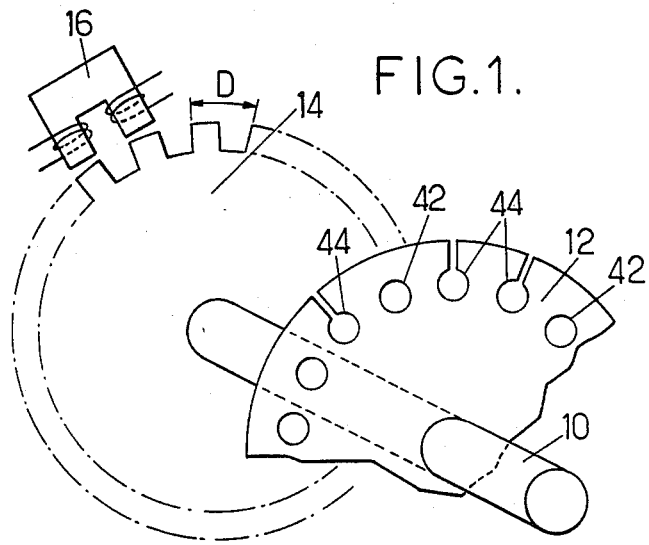
FIG. 1 is a general diagram showing the wheels of the device of the invention and a detector associated with the clock wheel.

Referring to FIG. 1, a device for determining the rotational motion of a shaft 10 comprises a coded wheel 12 and a clock wheel 14 fixed on the shaft. The clock wheel 14 is formed by a disk made, at least in its circumferential part, from a material having high magnetic permeability at high frequencies. At the periphery it is formed with a regular set of teeth of angular spacing D. It is not necessary for the wheel to be in the form of a disk. It may also be in the form of a cylinder or even a truncated cone.

At least one detector 16 is associated with the wheel. Numerous types of detectors are known which may be used. But most require a comparison of the signal with a threshold, which makes them very sensitive to statics or stray signals. In addition many do not tolerate the frequency and amplitude variations of the energization signal of the detector. The device of the invention which will now be described is based on a quite different principle using detection of the phase shift change between the energizing signal (taken as a reference) and the detected signal. Said detected signal may be constituted by the difference between the voltages taken at the end connections of two coils belonging to the same detector.

Figure 3:
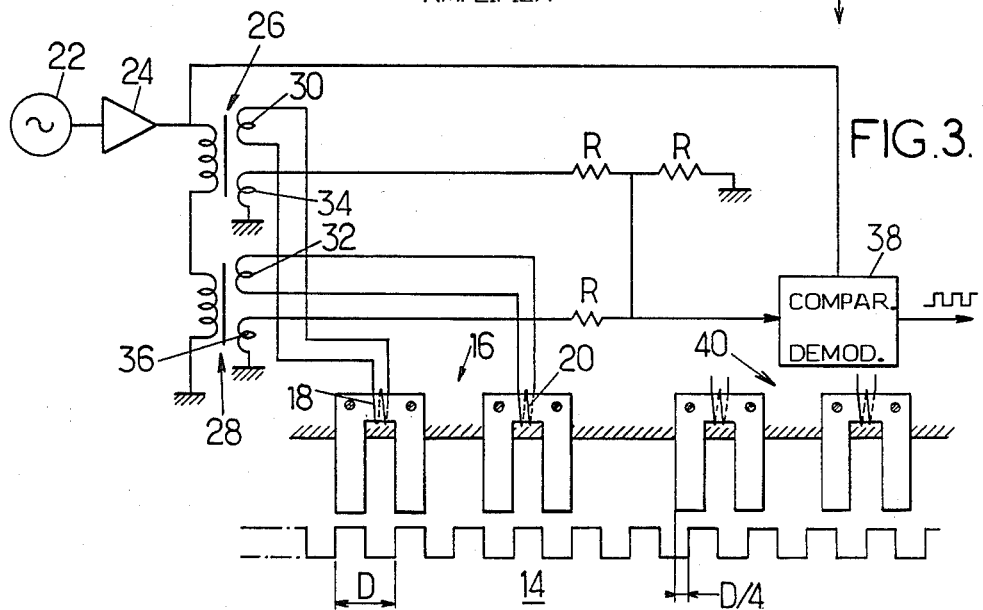
FIG. 3 is a schematic diagram showing one possible construction of a processing circuit associated with the sensor of the clock wheel including a linear development of the peripheral teeth of the clock wheel.

Detector 16 can as shown by way of example in FIG. 3 comprises two magnetic cores, made advantageously from the same material as the wheel, each comprising pole pieces the circumferential width of which is substantially equal to that of a tooth and spaced apart by an angular spacing (or by a whole number of angular spacings). The two magnetic cores are offset by a whole number of angular spacings plus a half angular spacing and they carry coils respectively 18 and 20. It can be seen that, when wheel 14 is moving, the reluctance of the magnetic circuit comprising the first magnetic core and "seen" by coil 18 increases when it decreases for coil 20 carried by the other magnetic core and vice-versa. There exists a geometric position where the inductances are equal. The voltage at the end connections of each of coils 18 and 20 is determined by the direction of variation of the reluctance. On working out the algebraic sum of the voltages developed at the terminals of coils 18 and 20 of the same detector 16, the phase is suddenly inverted when passing from one side to the other of the balance position. This phase inversion is readily detected by a comparison between the energizing signal and the signal obtained by algebraic summing. It should be noted that the coils represent a convenient summing means but could however be replaced by a floating differential amplifier.

Such phase detection may more particularly be achieved by means of a circuit of the kind shown in FIG. 3. This circuit comprises a high frequency oscillator 22 delivering a carrier wave (usually working in a range between 40 kHz and 1 MHz) which, through an amplifier 24, actuates the primary windings of two coupling transformers 26 and 28 connected in series. Each of the coupling transformers 26 and 28 comprises a secondary 30 or 32, driving a respective coil 18 or 20, and secondary 34 or 36 delivering a signal output. It can be seen that coils 18 and 20 form an inductive divider and that the output voltage is apportioned proportionally to the inductance of these coils, which inductances are connected to the reluctances of the magnetic circuits. An algebraic summing circuit formed of resistors R works out the algebraic sum of the signals delivered by the secondaries 34 and 36 and applies it to a demodulator-comparator 38 which also receives a reference signal from the amplifier 24. Thus, at the output of the demodulator-comparator, square waves are obtained each front of which corresponds to a balance position of the reluctances of coils 18 and 20.

It can be seen that the system is insensitive to the amplitude and frequency variations which may be due to the energizing oscillator or to imperfect mechanical guiding of the wheel: the phase inversion always occurs for the same position of the wheel.

A second detector 40, offset by D/4 from the first one, may be provided for determining the direction of movement of wheel 14. Other detectors, offset with respect to each other by a whole fraction of the tooth angular spacing D, may further be provided for obtaining a large number of measuring points per wheel revolution, by using an assembly of Vernier type.

The coded wheel 12 is formed of a thin disk (which may be replaced by a cylinder) made from a non-magnetic and good electrically conducting material, such as copper or aluminium. The binary coded holes are of two different types. Holes 42 are simple circular perforations: it will be assumed that they correspond to zeros.

The other holes 44 comprise perforations identical to the preceding ones but connected to the edge of the wheel by a narrow slit. It will be assumed that they indicate ¢1". After perforation, the disk may be coated with an insulating material closing the holes, so that it presents a smooth surface.

Holes 42 and 44 are spaced evenly apart about a circle at the same angular spacing D as the teeth of wheel 14.

The sensor associated with the wheel 12 comprises two coils 46 and 48 without magnetic cores, placed opposite each other on one side of the disk at a position such that the holes pass in front of them. Detection is based on the radiation of the mutual coupling between coils 46 and 48.

In fact, the effect of the presence of a circular perforation between coils 46 and 48 is equivalent to that of a short circuit turn added to the secondary of the transformer formed by the two air coils. The presence of a perforation opening at the periphery of the disk has an effect equivalent to that of a capacitor connecting the two hot spots of coils 46 and 48. Coupling is then greater than that provided by the air coils in the absence of a perforated disk.

In order to draw the best possible advantage from this arrangement, the slit must have a width about a tenth of that of the hole. In addition, the distance between holes, and between each hole and the edge of the disk, must not be substantially greater than the diameter of the hole (or than its dimensions if this hole is not exactly circular).

Figure 2:
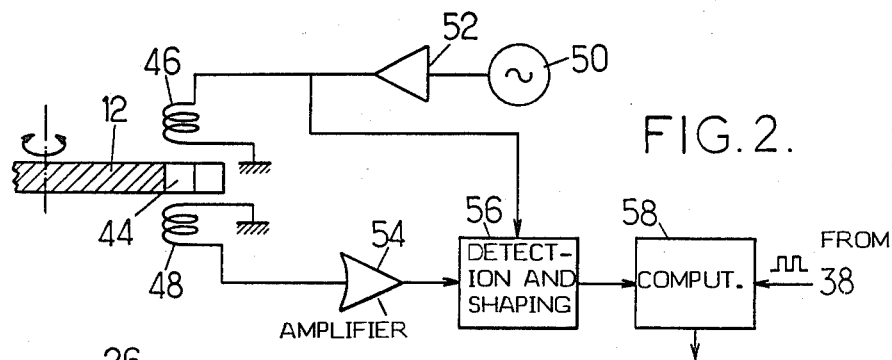
FIG. 2 is a block diagram of the sensor and of the electronics associated with the coded wheel.

The detection circuit considered may more particularly be the one shown schematically in FIG. 2. This circuit comprises an oscillator 50 which drives the emitting coil 46 through an amplifier 52. The receiving coil 48 is connected through an amplifier 54, to a detection and shaping circuit 56 which also receives a reference signal from the amplifier 52.

In this case, when a perforation 42 comes between the coils, the energy radiated by the emitting coil 46 is absorbed by the short circuit turn effect: the current which flows through the reception coil 48 becomes practically zero. When, on the other hand, an emergent perforation 44 comes between the coils, the level of the reception signal delivered by coil 48 is greater than that which it would deliver in the absence of disk 12.

By an appropriate dimensioning of coils 46 and 48, of their spacing and the shape of the holes, at the terminals of the receiving coil 48 a voltage gain may be obtained greater than 30 dB depending on whether the coils are opposite a hole 42 or 44.

The detection may be achieved in a conventional way by comparing the amplitude of the output signal with that of the energizing signal.

For providing great reliability of measurement, the device further comprises a processor 58. In the memory of processor 58 is recorded the binary sequence represented by the holes 42 and 44. The pulses delivered by the detector 16 are applied to the processor for causing the information supplied by coil 48 to be read at each passage past a tooth. If a setting operation has been carried out initially, for determining the angular position of wheel 12 it is sufficient to compare the code stored in processor 58 and the code read from the coded wheel 12 for each new pulse delivered by circuit 38. When the information coincides, the probability that the system is operating correctly is very high. In fact, the failure of either the sensor or the detector destroys the normal sequence and the breakdown of the system can be detected. As for the simultaneous breakdown of the sensor and the detector, it may be determined by initiating a test sequence as soon as the clock wheel no longer delivers pulses, after a certain time delay. The embodiment of the device which has just been described by way of example is in no way limitative.

Numerous modifications of the invention are possible. It is not necessary that holes 42 and 44 be circular: they may have forms approximating a circle, or even a rectangular form, although the circular form is advantageous from the electric point of view. Moreover, it is directly transposable to the measurement of the movement or position of an object movable in translation.

What is claimed is:

1. For measurement of a motion of a body, a device comprising:
   (a) coded means made from an electrically conducting material, drivably connected to said body for motion therewith about an axis, comprising at least one edge formed with a plurality of holes in close proximity to said edge and regularly distributed angularly about said axis, said holes including first holes separated from said edge and second holes connected to said edge by a slit narrow in comparison with the size of said holes, said first and second holes representing different binary digits;
   (b) sensor means placed at a predetermined location on the path of said holes and comprising two coils straddling said coded means;
   (c) and means associated with said sensor means for detecting the mutual inductance of said coils.

2. A device according to claim 1, wherein the two coils are mutually aligned air coils, one of said coils being associated with a high frequency energizing circuit and the second with a circuit for comparing the amplitude of the output signal of said second coil with an energizing signal delivered by said energizing circuit.

3. A device according to claim 2, wherein said holes constitute a regular sequence of zeroes and ones.

4. A device according to claim 1, wherein said holes define a non-cyclic binary code, further comprising a processing circuit associated with the sensor means and having means for storing said non-cyclic binary code.

5. For measurement of rotation of a a body, a device comprising,
   (a) a coded wheel of electrically conducting material, drivably connected to said body for rotation therewith about an axis, comprising at least one circular edge and a plurality of holes formed in said wheel in close proximity to said edge and regularly distributed angularly about said axis, said holes including first holes separated from said edge and second holes connected to said edge by a slit narrow in comparison with the size of said hole;
   (b) sensor means placed at a predetermined location close to the path of said holes, and comprising two coils straddling said coded wheel, and
   (c) means associated with said sensor means for detecting the mutual inductance of said coils.

6. A device according to claim 5, further comprising a clock wheel connected to the first wheel for rotation therewith, said clock wheel having a plurality of teeth equal to the number of holes of said coded wheel and being associated with detector means generating a pulse upon each passage of one of said teeth.

7. A device according to claim 6, wherein the clock wheel is of material having high magnetic permeability at high frequencies, said teeth are distributed with the same angular spacing as said holes, and said detector means comprise two detection units, each of said units including a magnetic core having at least one pole close to the path of said teeth, whereby rotation of said clock wheel causes changes in the reluctance of a magnetic circuit including said core and a coil operatively associated with said core, the poles of said two circuits being separated by an odd number of half said angular spacing, whereby the reluctance of the magnetic circuit of the first of said coils increases when the reluctance of the magnetic circuit of the second of said coils decreases.

8. A device according to claim 7, wherein the two magnetic cores present two poles which simultaneously confront two teeth, said poles of different ones of said cores being spaced by an odd number of half said angular spacing, wherein each of said cores carries a measuring coil, said device further comprising a summing circuit for summation of signals generated by the measuring coils when they are energized by a same high frequency signal.

9. A device according to claim 8, wherein the holes of said coded wheel constitute a predetermined non-cyclic binary code and wherein said device further comprises processor means having a memory in which is stored said predetermined non-cyclic binary code, said processor means being arranged for vertifying, upon occurence of each pulse generated by said detector means, that the sequence of the coded wheel as provided by said sensor means is identical to the stored sequence.

* * * * *